Patented Sept. 27, 1932

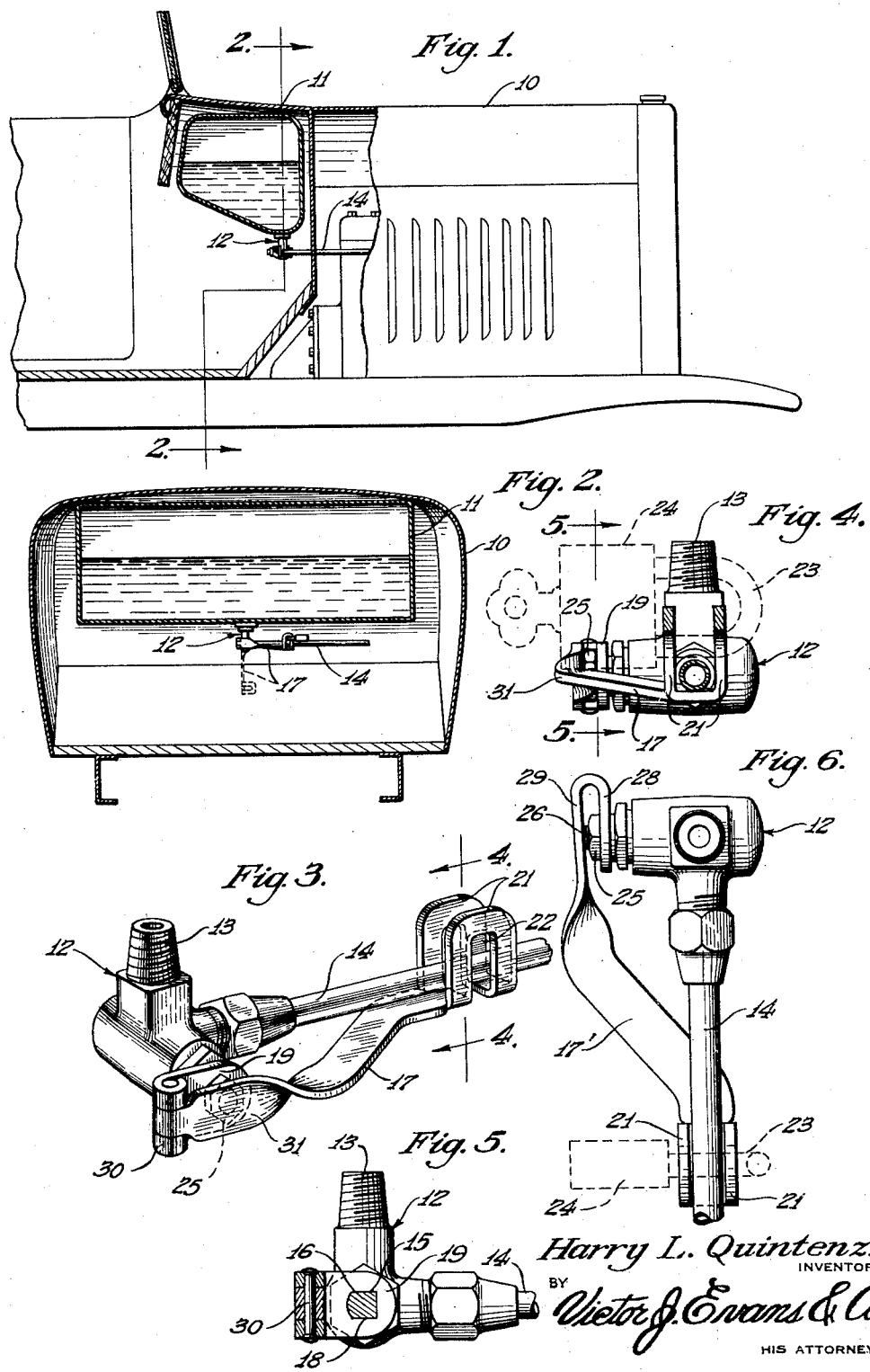

1,879,482

UNITED STATES PATENT OFFICE

HARRY L. QUINTENZ, OF CHICAGO, ILLINOIS

VALVE LOCK

Application filed August 12, 1931. Serial No. 556,687.

This invention relates to certain novel improvements in valve locks, and has for its principal object the provision of an improved construction of this character which will be highly efficient in use and economical in manufacture.

It is an object of this invention to provide an improved valve lock for fuel containers.

It is another object of the invention to provide an improved anti-theft valve lock for the fuel tank of an automotive vehicle.

It is another object of the invention to provide an improved anti-theft valve lock for the fuel tank of a Ford automotive vehicle.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a fragmentary side elevational view of an automobile, partly in section, showing a preferred form of construction of the invention associated therewith;

Fig. 2 is a sectional view on line 2—2 in Fig. 1;

Fig. 3 is a perspective detail view of the invention;

Fig. 4 is a sectional view on line 4—4 in Fig. 3;

Fig. 5 is a sectional detail view; and

Fig 6 is a top plan view of a modification of the invention.

In the drawing, which illustrates a preferred and practical embodiment of the invention, the fuel tank of an automotive vehicle 10 is indicated at 11 and is provided with a shut-off valve 12 having a threaded neck 13 secured in a threaded aperture in the tank 11. Leading from the valve 12 to the carburetor (not shown) is a fuel supply conduit 14. The valve 12 includes a stem 15 which has a non-circular portion 16 upon which is arranged, for movement with the valve stem 15, one end portion 19 of a member 17, said end portion 19 being provided with an aperture 18 for the reception of the non-circular valve stem portion 15.

The member 17 includes, at the end thereof opposite the portion 19, a pair of spaced elements 21 which straddle the fuel supply conduit 14 when the member 17 is swung into the full line position of Fig. 3. The elements 21 are provided with apertures 22 for the passage therethrough of the bolt element 23 of a conventional lock 24, thereby to lock the member 17 to the fuel supply conduit 14 and prevent movement of member 17 and the valve stem 15, thus shutting off fuel supply to the carburetor (not shown) and preventing unauthorized operation of the vehicle 10.

In Figs. 2 and 3 the portion 19 of the member 17 is retained on the threaded portion 27 of the valve stem by a nut 25, and unauthorized access to this nut by a tool is prevented by the body portion 31 of the member 17 which is connected to the portion 19 by a hinge joint 30, the nut 25 being disposed between the portion 19 and the main body portion 31 of the member 17.

In the modification shown in Fig. 6, the hinge joint 30 is omitted from the member 17 and the main body portion 29 of the member 17' is bent back upon itself to provide the portion 28 which is apertured to receive the non-circular portion 16. The nut 25 being disposed between the portions 28 and 29 renders the nut 25 inaccessible to a tool that an unauthorized person might attempt to use in tampering with the device in an attempt to open the valve.

While I have described the invention as being particularly adapted for use on Ford and other automotive vehicles in which the fuel tank and shut-off valve 12 are arranged after the manner shown in Fig. 1, my invention may be applied to the shut-off valve and outlet conduit of any kind of liquid containing tank, such as stationary gasoline and oil tanks, and the like, and when so applied the invention provides a simple, inexpensive valve locking device.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In combination with a liquid container having an outlet conduit provided with a valve including a stem, a member mounted upon the stem for movement therewith and including a pair of spaced elements adapted to straddle the conduit when the valve is in closed position and provided with apertures for the passage therethrough of the bolt element of a lock, so as to lock the member to the conduit and prevent movement of the stem, unauthorized opening of the valve, and unauthorized withdrawal of liquid from the container.

2. In combination with an automotive vehicle fuel tank provided with a fuel supply conduit to the carburetor and the conduit being provided with a valve including a rotative element, a member having one end attached to said element for movement therewith, a pair of elements at the other end of said member adapted to straddle the conduit when the valve is in closed position, and said second named elements being provided with apertures for the passage therethrough of a locking element whereby to prevent unauthorized opening of the valve and operation of the vehicle.

In testimony whereof I affix my signature.

HARRY L. QUINTENZ.